United States Patent [19]
Schmucker et al.

[11] Patent Number: 5,574,462
[45] Date of Patent: Nov. 12, 1996

[54] PROXIMITY DETONATOR

[75] Inventors: Georg Schmucker, Ulm/Donau; Leo Fischer, Pfuhl, both of Germany

[73] Assignee: Licentia-Patent Verwaltungs GmbH, Frankfurt, Germany

[21] Appl. No.: 638,428

[22] Filed: Dec. 4, 1975

[51] Int. Cl.[6] .................................................. G01S 13/08
[52] U.S. Cl. ........................................................... 342/68
[58] Field of Search ...................... 102/70.2 P; 343/7 PF

[56] References Cited

U.S. PATENT DOCUMENTS

| | | | |
|---|---|---|---|
| 3,900,875 | 8/1975 | Scheets | 343/7 PF |
| 3,906,493 | 9/1975 | Adrian et al. | 343/7 PF |
| 3,913,485 | 10/1975 | Holmes et al. | 343/7 PF |
| 3,926,121 | 12/1975 | McCracken | 343/7 PF |

*Primary Examiner*—John B. Sotomayor
*Attorney, Agent, or Firm*—Spencer & Frank

[57] ABSTRACT

A proximity detonator which derives its firing criterion from reflected beam measurements and thus obtains information about the radial relative velocity of the detonator with respect to its target object by evaluating the Doppler effect, wherein the firing signal is produced by a circuit including a function generator whose output voltage has a time sequence which corresponds to the decrease in radial relative velocity as the detonator approaches its target object (possibly under consideration of a correction value resulting from the firing law), a voltage controlled oscillator whose control input is connected to the output of the function generator, and a phase comparator having two signal inputs, one of which receives a Doppler signal which corresponds to the radial relative velocity and the other of which is connected to the output of the oscillator. The phase comparator compares the two input signals and emits the firing signal whenever the frequency of the Doppler signal is equal to the comparison frequency from the oscillator.

5 Claims, 1 Drawing Sheet

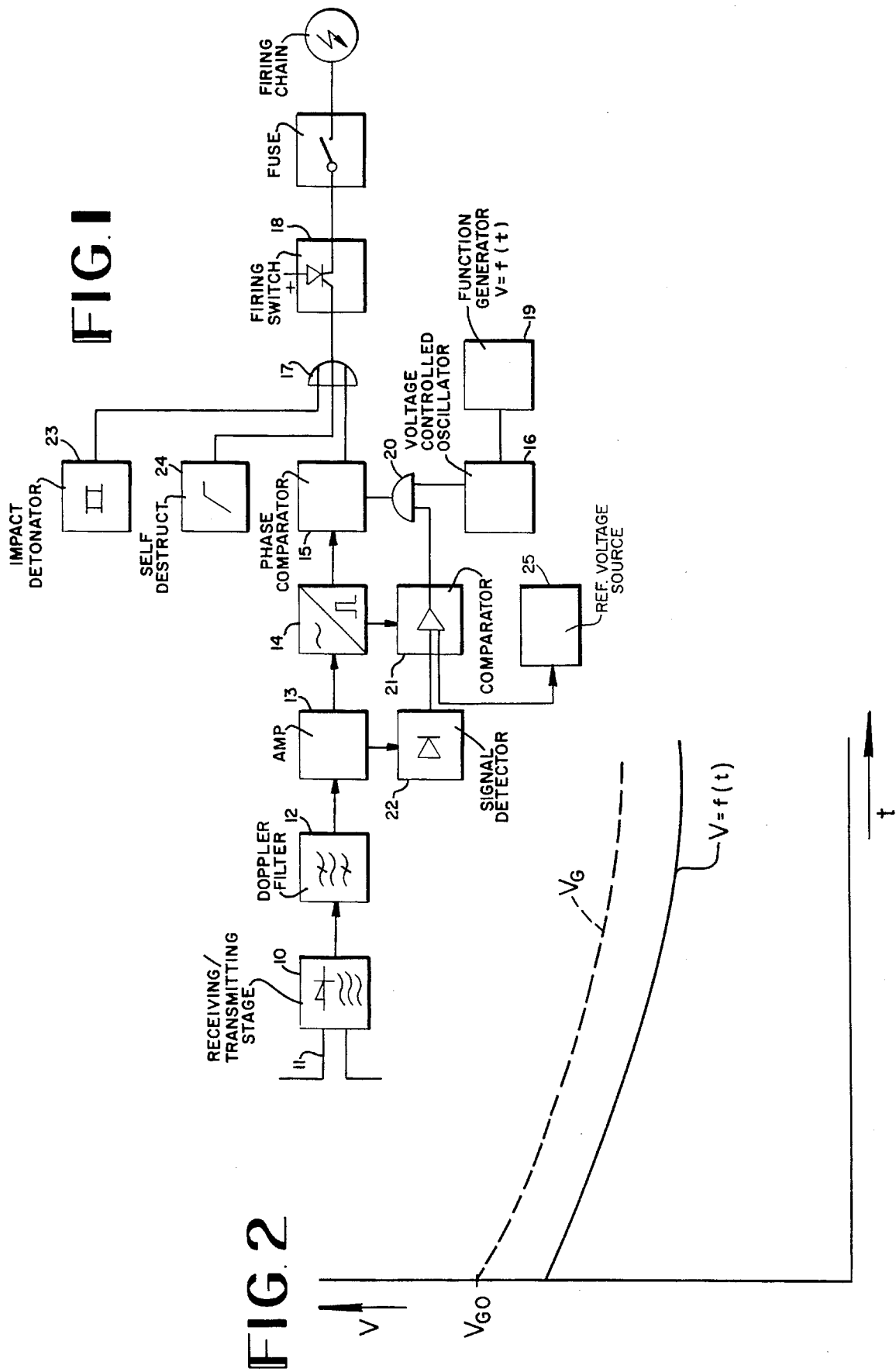

PROXIMITY DETONATOR

BACKGROUND OF THE INVENTION

The present invention relates to a proximity detonator which derives its firing criterion from reflected beam measurements and from them, by evaluation of the Doppler effect, obtains information about the radial relative velocity of the detonator with respect to its target object.

Such a detonator is used, for example, to fire the ammunition of tubular weapons when fighting flying targets by effecting firing at the point in time, which is defined by the respective firing law, so that with given economically justified expenditures the combat efficiency is optimum.

Reflected beam measurements in such a detonator are made, for example, by means of a radar device which is built into the detonator. If the detonator approaches the target, comparison of the received radar signals with the transmitting frequency produces a Doppler oscillation whose frequency depends on the radial relative velocity of the detonator with respect to its target object and whose amplitude continues to increase over the received noise with decreasing distance to the target. If the Doppler frequency which has been obtained at a large distance from the target is stored, there results a continuously increasing frequency difference between the stored frequency and the momentarily obtained Doppler frequency because the line of sight between the detonator and the target deviates by a wider angle from the line of the course of the detonator as the distance from the detonator to the target becomes shorter, unless the detonator is on a direct collision course. The firing law therefore, may provide that the detonator emit its firing signal as soon as the difference between these two frequencies (stored frequency and momentary frequency) has reached a given value.

For small caliber weapons, however, the expenses involved for a detonator of the above-mentioned type are generally not justifiable economically inasmuch as "small caliber" weapons are those which have a caliber of 35 or 40 mm or less.

SUMMARY OF THE INVENTION

It is the object of the present invention to simplify the above-mentioned detonator as far as costs are involved and to improve it.

The above object is achieved according to the present invention in that in a proximity detonator for a projectile of the above-mentioned type, i.e., wherein the firing criterion is derived by evaluating the Doppler effect in reflected beam measurements to obtain information about the relative radial velocity of the detonator with respect to the target object, the circuit for producing the firing signal includes a function generator whose output voltage has a time sequence which corresponds to the decrease of the radial relative velocity upon approach of the detonator or projectile to its target objective (possibly under consideration of a correction value resulting from the firing law), a voltage-controlled oscillator whose control input is connected to the output of the function generator, and a phase comparator which has two signal inputs. One of the signal inputs of the phase comparator is charged with, i.e., fed, a Doppler signal which corresponds to the radial relative velocity and the other signal input of the phase comparator is connected to the output of the oscillator. The function generator and the oscillator are dimensioned so that the oscillator emits the comparison frequency which is required for the firing moment to the phase comparator, and the phase comparator emits the firing signal when the frequency of the Doppler signal is equal to the comparison frequency.

In order to prevent false firings when interference causes interruptions in the received signals, which interruptions are unavoidable in practice, it is advisable, according to a further feature of the invention, to include an AND circuit between the output of the oscillator and the input of the phase comparator and to connect the second or enabling input of the AND circuit to the output of a further comparator which monitors the amplitude of the received signals.

BRIEF DESCRIPTION OF THE DRAWINGS

FIG. 1 is a block circuit diagram of a preferred embodiment of a proximity detonator according to the invention.

FIG. 2 shows a diagram representing the dependence on time of the output signal of the function generator and the correction value resulting from the firing law.

DETAILED DESCRIPTION OF THE PREFERRED EMBODIMENTS

In the detonator according to the invention it is assumed that compared to the speed of the projectile only relatively slow speeds of the target objects of about a maximum of 450 m/sec will occur. This results in a very simple firing law in which the relative velocity can be set to be equal to the velocity of the projectile and in which the target velocity can be neglected. Under these circumstances the firing criteria can be derived from frequency measurements and frequency comparisons. For this the following values must be available or measured, respectively:

(a) the velocity of the projectile $v_G$. This value can be derived from the decrease in velocity of the projectile over time in dependence on the distance traveled by the projectile after firing same in that the time sequence of a voltage $V=f(t)$ from a function generator is designed so that it corresponds to the decrease in velocity of the projectile (b) the comparison frequency of the firing moment. The time sequence of the voltage from the function generator must be varied pursuant to the firing law so that a voltage controlled oscillator (VCO) which is controlled by this voltage generates the comparison frequency $f_{VCO}$, required at any given moment, for the firing moment and emits it.

(c) the approach or relative radial velocity $v_a$. This value is determined when the projectile approaches the target from the continuously measured Doppler shift.

$$f_a = \frac{2v_a}{\lambda}$$

The evaluation and the determination of the firing moment are effected by a comparison of the Doppler frequency with the comparison frequency in a phase comparator. The firing moment is reached when the Doppler frequency $f_D$ is equal to the comparison frequency $f_{VCO}$ or is less than the latter, i.e., when $$f_D \leq f_{VCO}.$$

Referring now to the drawing there is shown a block circuit diagram of a detonator in which the present invention is realized. It is to be understood that the detonator is incorporated in a projectile, preferably ammunition of a caliber of 40 mm or less, in a well known manner.

As shown in FIG. 1, the detonator includes a transmitting-receiving stage 10, which is preferably a self-oscillating mixer stage, wherein the transmitted frequency $f_s$ is generated and transmitted via the antenna 11. The signal $f_e=f_s+f_D$ reflected by the target and received again by the antenna 11 is mixed in the mixer stage 10 with the transmitted frequency $f_s$. The resulting difference signal is the Doppler frequency signal $$f_D=f_e-f_s$$

which depends on the speed of approach. The Doppler frequency signal $f_D$ is filtered out in a suitable Doppler filter 12 and amplified in a signal amplifier 13. Since only Doppler frequencies corresponding to the firing frequency $f_{VCO}$ need be evaluated this Doppler filter 12 can be designed to be relatively narrowbanded, the transient behaviour of course having to be considered. After the appropriate amplification, the Doppler signal is converted to rectangular pulses in a pulse shaping circuit 14 and fed to a phase comparator 15.

In the phase comparator 15, the Doppler signal $f_D$ at the output of circuit 14 is compared with the comparison frequency signal $f_{VCO}$ from a voltage controlled oscillator 16. The phase comparator 15 produces an output or firing signal whenever the Doppler frequency is equal to or less than the comparison frequency produced by the oscillator 16. The output firing signal from the phase comparator 15 is fed via an OR circuit 17 to a firing switch 18 to trigger same and cause the detonation of the explosive in a known manner.

As indicated above the comparison frequency $f_{VCO}$ is generated in the controllable oscillator 16. To control this controllable oscillator 16, its control input is connected to the output of a function generator 19. The output voltage $V=f(t)$ of the function generator 19, which serves as the control voltage of the oscillator 16, has a time sequence which corresponds to the decrease in velocity of the projectile in dependence on the distance traveled since firing of the projectile and preferably additionally on a correction value resulting from the firing law.

FIG. 2 is a diagram representing the dependence on time of this function $V=f(t)$ of the generator 19 and of the correction value. This function decreases exponentially with time in the same manner as the speed of the projectile decreases when traveling from its starting point to its target. The initial value $V_{GO}$ corresponds to the starting velocity of the projectile.

The output signal of the generator 19 preferably is not equal to the function $V_G$ but equal to the function V. These two functions differ from each other by the correction value resulting from the firing law.

The firing law optimizes the combat efficiency by considering the fragment velocity of the projectile and the relative velocity between the projectile and the target. The firing law may—for example—be expressed by the following equation:

$$v_{az} = \frac{v_G}{\sqrt{v_f^2 + v_G^2}},$$

wherein
$v_{az}$=radial relative velocity in the optimal firing position
$v_G$=velocity of the projectile
$v_f$=velocity of the fragments From FIG. 2 it is evident that the frequency of the oscillator 16 decreases with time.

Preferably, as shown in FIG. 1, the comparison frequency signal emitted by the oscillator 16 is fed to the phase comparator 15 via an AND circuit 20, which feeds the comparison signal $f_{VCO}$ to the phase comparator 15 only if the Doppler signal $f_D$ is likewise present. In order to achieve this result the second or enabling input of the AND circuit 20 is connected to the output of a further comparator 21. The input of the comparator 21 is connected to the output of an amplitude detector 22 which is connected to the amplifier 13 and monitors the amplitude of the output signals produced by the receiving-transmitting stage 10. The comparator 21 compares the output signal from the amplitude detector 22 with an internally generated reference voltage from a reference source 25, and produces an enabling signal for the AND circuit 20 whenever the reference voltage is reached or exceeded, indicating the presence of a Doppler signal $f_D$. This circuit makes it possible to avoid the generation of false firing signals by the phase comparator 15 upon the occurrence of interference signals.

As shown in FIG. 1, the projectile may additionally include an impact detonator 23 and a self-destruct signal generator 24 whose outputs are each connected with the firing switch 18 via the OR circuit 17.

It will be understood that the above description of the present invention is susceptible to various modifications, changes and adaptations, and the same are intended to be comprehended within the meaning and range of equivalents of the appended claims.

What is claimed is:

1. In a proximity detonator for a projectile which derives its firing criterion from reflected beam measurements and thus obtains information about the radial relative velocity of the detonator with respect to its target object by evaluating the Doppler effect, said proximity detonator including: transmitter-receiver means for transmitting a signal of a given frequency, for receiving the signal reflected by the target and for producing a Doppler signal corresponding to said radial relative velocity from said transmitted and received signals at its output; circuit means responsive to said Doppler signal for producing a firing signal; and means responsive to the firing signal for detonating an explosive; the improvement wherein said circuit means comprises: a function generator for producing an output voltage having a time sequence which corresponds to the decrease in said radial relative velocity as the projectile, and hence the detonator, approaches the target; a voltage controlled oscillator means, having its control input connected to the output of said function generator, for producing a comparison frequency output signal which corresponds to desired firing moments; and a phase comparator means, having first and second signal inputs connected to the output of said transmitter-receiver means and said oscillator means respectively, for comparing the frequency of said Doppler signal with said comparison frequency signal and for producing said firing signal whenever the frequency of said Doppler signal is equal to the frequency of said comparison frequency signal.

2. The proximity detonator as defined in claim 1 further comprising: signal generating means responsive to the output signal from said transmitter-receiver means for producing an output signal when a Doppler signal is present; and an AND circuit, having two signal inputs, connected between the output of said oscillator means and said phase comparator means, said AND circuit having one signal input connected to the output of said signal generating means, its other signal input connected to the output of said oscillator means, and its output connected to said second signal input of said phase comparator means.

3. The proximity detonator as defined in claim 2 wherein said signal generating means includes: an amplitude detector for monitoring the amplitude of the output signals from said transmitter-receiver means; a reference voltage source; and an amplitude comparator means for comparing the output signal from said signal detector with a reference voltage from said reference voltage source and for producing an output signal to enable said AND circuit whenever the amplitude of the output signal from said amplitude detector is equal to or greater than the magnitude of said reference voltage.

4. A proximity detonator as defined in claim 1 wherein said detonator is included in a projectile and said projectile is ammunition of a caliber less than approximately 40 mm.

5. A proximity detonator as defined in claim 1 wherein said phase comparator means also produces said firing signal when the frequency of said Doppler signal is less than the frequency of said comparison frequency signal.

* * * * *